United States Patent [19]

Vahabzadeh

[11] Patent Number: 4,747,809
[45] Date of Patent: May 31, 1988

[54] HYDRAULIC CONTROL FOR A CONTINUOUSLY VARIABLE TRANSMISSION

[75] Inventor: Hamid Vahabzadeh, Rochester Hills, Mich.

[73] Assignee: General Motors Corporation, Detroit, Mich.

[21] Appl. No.: 61,955

[22] Filed: Jun. 15, 1987

[51] Int. Cl.⁴ .............................................. F16H 11/02
[52] U.S. Cl. ......................................... 474/28; 74/731
[58] Field of Search ...................... 474/18, 28; 74/731, 74/732, 867, 868

[56] References Cited

U.S. PATENT DOCUMENTS

| | | | |
|---|---|---|---|
| 3,918,312 | 11/1975 | Espenschied et al. | 474/18 X |
| 4,608,031 | 8/1986 | Vahabzadeh | 474/28 X |
| 4,642,069 | 2/1987 | Sawada et al. | 474/28 |

*Primary Examiner*—James A. Leppink
*Assistant Examiner*—Thut M. Bui
*Attorney, Agent, or Firm*—Donald F. Scherer

[57] ABSTRACT

A torque sensitive squeeze control for a variable ratio pulley drive system has a fluid translating unit, such as a pump, disposed in the input torque path. One member of the fluid translating unit is rotated by the input drive shaft while another member is fixed for rotation with an input pulley shaft. If a rotational difference between the input drive shaft and the pulley shaft is present, the fluid translating unit is effective to increase the pressure in the squeeze control piston of the input pulley thereby increasing the torque capacity of the pulley. A speed differential will occur when a torque difference between the two shafts if present. The hydraulic control for the output pulley is via a controlled servo valve mechanism which permits operator control of the drive ratio between the pulleys independently of the squeeze force on the input pulley.

1 Claim, 1 Drawing Sheet

HYDRAULIC CONTROL FOR A CONTINUOUSLY VARIABLE TRANSMISSION

BACKGROUND OF THE INVENTION

This invention relates to controls for continuously variable pulley systems and more particularly the squeeze controls for such systems.

Prior art directs squeeze controls for continuously variable transmissions, of the pulley and belt type, are generally of the mechanical type. These devices employ a pair of relatively movable cam members which are disposed in the input or output torque path. The transmitted torque causes axial movement of one of the cam members which in turn causes a squeeze load to be imposed on the pulley system.

These systems are effective; however, they do require additional axial space which increases the overall length of the continuously variable transmission. The mechanical systems are quite often accompanied by a hydraulic system which is used to supplement the squeeze force and to establish the overall ratio within the continuously variable transmission. The hydraulic systems generally depend on external signals, such as engine throttle position or engine vacuum, to determine the torque level and therefore the squeeze force required.

A hydromechanical system, such as that shown in U.S. Pat. No. 4,608,031 issued Aug. 26, 1986, describes the continuously variable transmission wherein a planetary gear mechanism on the output shaft is subjected to output torque. One of the gear elements, the carrier, is connected to a servo valve element which in turn is operable to distribute fluid to a control piston on one of the pulleys for squeeze control and ratio establishment.

SUMMARY OF THE INVENTION

The present invention uses only hydraulic pressure generating mechanisms for the establishment of the squeeze control force. This is accomplished by placing a rotary fluid translating unit, such as a pump, in a torque path of the continuously variable transmission. With the present invention, the input torque path is considered the most appropriate. However, output torque can be used as well. The fluid translating unit has one member connected to the drive shaft and another member connected to one of the pulleys. This unit generally fits within the axial space already required by the input drive connection of the transmission. A rotational difference between the members results in pressurized fluid flow through the fluid translating unit. The fluid will operate on the conventional control chamber for the pulley to increase the axial squeeze force and torque transmitting ability of the pulley system.

It is therefore an object of this invention to provide an improved squeeze control for a variable ratio belt and pulley drive mechanism wherein one of the pulleys has a movable member which is subject to hydraulic pressure to effect the axial squeeze force on the pulley and belt and wherein the hydraulic pressure is supplied by a fluid pump which has two rotatable members, one of which is rotatable with a torque transmitting shaft and the other of which rotates with the pulley whereby a rotational difference between the two pump members causes a change in the hydraulic pressure and therefore a change in the squeeze force on the pulley and belt.

It is another object of this invention to provide an improved squeeze control for a variable ratio pulley and belt mechanism wherein a fluid pump disposed directly in the input torque path is operable to establish a control pressure, proportional to input torque, in the axial squeeze control chamber of the input pulley member.

DESCRIPTION OF THE EMBODIMENTS

Figure 1:
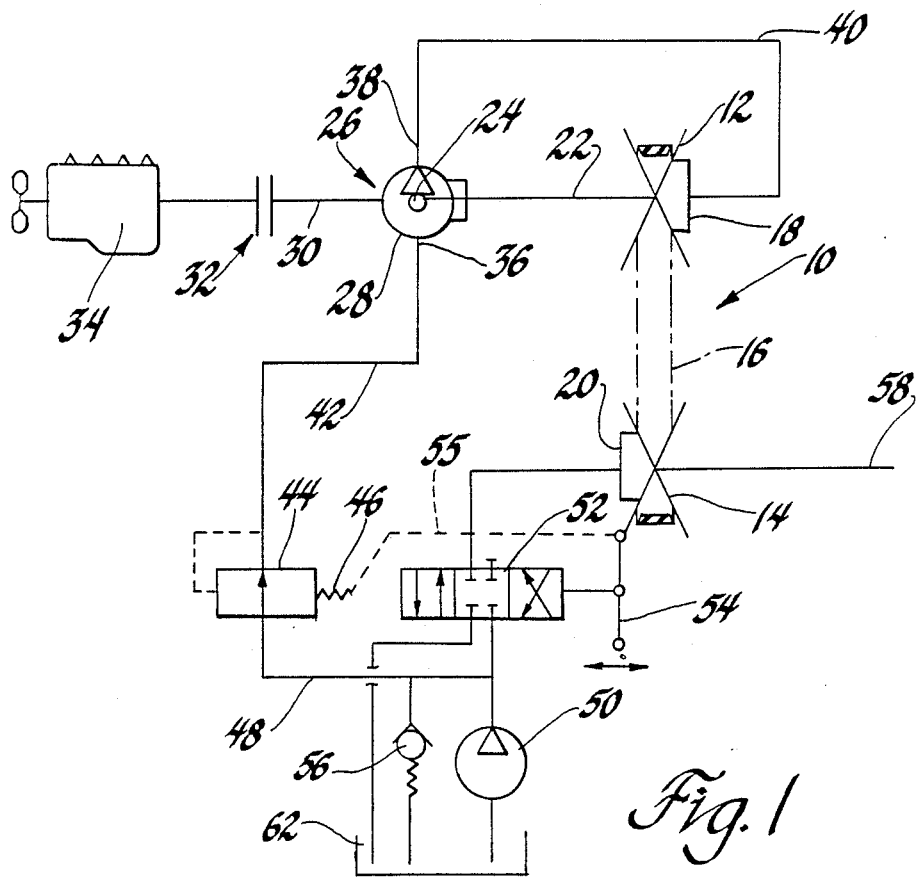
FIG. 1 is a schematic representation of the preferred embodiment of the invention.

Referring to FIG. 1, there is seen a continuously variable transmission generally designated 10 which is comprised of an input pulley 12, an output pulley 14 and a belt member 16 which frictionally engages the pulleys 12 and 14 to transmit torque and speed therebetween. Each of the pulleys 12 and 14 is constructed to have a respective hydraulic control chamber 18 and 20. These control chambers 18 and 20 are operable in a well known manner to cause the sheaves of the respective pulleys 12 and 14 to move axially toward and away from each other to thereby effect the drive ratio between the pulleys 12 and 14 and the squeeze force on the belt 16.

Pulley 12 has an input shaft 22 which is drivingly connected to one member 24 of a fluid translating unit such as a rotating housing fluid pump 26. Another rotating member 28 of the fluid pump 26 is drivingly connected to an input shaft 30 which in turn is selectively connectable to a clutch 32 to a prime mover 34 such as an internal combustion engine. The pump 26 can be constructed from many of the well known types of pumps such as gear pumps, vane pumps or piston pumps. Preferably gear pumps are utilized in this construction. The pump is constructed to permit two of the elements to rotate. The pump must be rotationally balanced since the whole pump assembly rotates with the input shaft.

With such devices, it is well known that when unitary rotation occurs, no pumping action will take place. As is well known with these pumps, relative rotation between the pumping members creates fluid flow between an inlet port 36 and a discharge port 38. In the particular arrangement, the discharge port 38 is in fluid communication through a passage 40 with the control chamber 18. The inlet port 36 is in fluid communication via a passage 42 with a pressure reducing downstream regulator valve 44. The regulator valve 44 is constructed in accordance with any of the well known downstream regulator valves. As is well known with such valves that pressure passing through the valve is operable to cause the valve to close when the downstream pressure reaches a predetermined value as established by a spring member designated 46, and displacement of the linkage 55, thereby producing a pressure differential proportional to the axial position of the output pulley (speed ratio). Hydraulic flow to the valve 44 is via a passage 48 which is in fluid communication with a system pump 50. This insures that a positive pressure is always present at port 36 when the transmission is operating. This pressure is increased at underdrive ratios by the movement of linkage 55 and spring 46. The system pump 50 supplies fluid to the servo valve 52 such that fluid pressure in the control chamber 20 can be increased or decreased by the operator through manipulation of a manual operator control 54. Maximum system pressure produced by the pump 50 is limited by a conventional relief valve 56. If the operator manipulates the control 54 such that the servo valve 52 moves leftward, the pump 50 is connected to the control chamber 20. This will provide for an increase in fluid pressure in the control chamber 20 resulting in the belt 16 being moved outward between the sheaves of pulley 14 and conversely the belt 16 will be moved inwardly between the sheaves of the pulley 12.

As the belt 16 moved outwardly, the lever 54 will respond to the movable sheave of pulley 14 to move rightwardly returning the servo valve 52 to the neutral position shown. If the manual lever 54 is moved rightward, chamber 20 is exhausted and the opposite effect will occur at the pulley 14. That is the sheaves will be moved further apart permitting the belt 16 to move inwardly. The pressure and control chamber 18 will cause the sheaves of pulley 12 to move together thereby moving the belt 16 outwardly. Again the movement of the one sheave of pulley 14 will cause the servo valve 52 to return to the neutral position shown.

The pressure in control chamber 18 is established by the pump or fluid translating unit 26. When a rotational difference occurs between the rotary members 28 and 24, fluid will be delivered to the chamber 18. The pressure of this fluid will cause the sheaves of pulley 12 to squeeze the belt 16. This will establish the squeeze load on the belt 16.

The pump 26 must transmit the input torque from the prime mover 34. If the pulleys 12 and 14 are not able to transmit the input torque to an output shaft 58, there will be rotational difference between the shafts 30 and 22 and therefore a rotational difference between members 28 and 24 of the pump 26. This rotational difference will cause fluid pressure to be generated in passage 40 which will result in an increase in the squeeze force on the belt 16 and therefore an increase in the torque capacity of the transmission 10. When the torque capacity of the transmission 10 is equal to or greater than the input torque on shaft 30, all of the torque will be transmitted from the prime mover 34 through the pulley system to the output shaft 58.

The pump 50 is designed to provide a fluid pressure which is greater than the pressure that will be generated by the maximum torque of the prime mover 34 within the fluid pump 26. In the alternative, the control chamber 20 can be made significantly larger than the control chamber 18. This will permit lower operating pressures, however the radial dimensions of the control pistons will be larger. What is important is that the pressure generated by pump 50 will be sufficient when operating on pulley 14 to overcome the squeeze force at pulley 12 such that the belt 16 can be moved inwardly between the movable sheaves 12 to effect the desired ratio change if necessary.

The pump 50 also supplies a charging pressure for the pump 26. This valve will create a pressure differential between the inlet side 48 and outlet side 42 which is proportional to the speed ratio of the drive with maximum pressure at maximum underdrive ratio. The regulator valve 56 for the system can be controlled to effect the maximum system pressure available at any time. Such control systems are well known in automatic transmissions.

Figure 2:
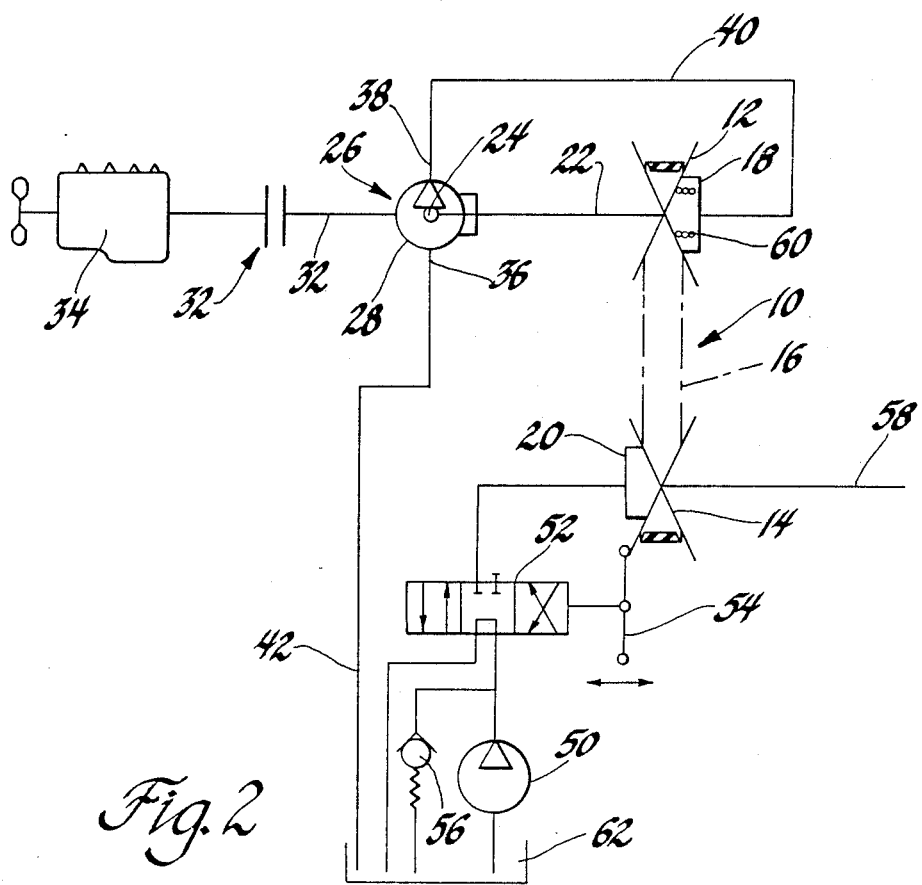
FIG. 2 is a schematic representation of another embodiment of the invention.

The control system shown in FIG. 2 is essentially the same as that described above for FIG. 1 with two exceptions. The control 18 has included therewith a spring member 60 which is operable to ensure a minimum squeeze force on the system. Such a spring member can be utilized with the FIG. 1 control also. The other difference between the control systems is that the pump 26 instead of being supercharged by the system pump 50 it has an inlet passage 42 which communicates with a system reservoir 62. It will be noted in FIG. 1 that the system reservoir 62 communicates with the pump 50 which then supplies pressure to the pump 26. With these minor differences the systems of FIGS. 1 and 2 operate identically. Therefore, it is not considered necessary at this point to provide another description of operation as those skilled in the art will recognize the similarity of these systems.

The pumps and valving of the above described systems are shown schematically. These units are well known in the art and a detailed description of their structure is not considered to be necessary as those skilled in the art will be familiar with both the structure and operation of these hydraulic units. The transmission 10 has also been shown schematically as these types of units are well known and have been utilized for a number of years particularly in industrial machine tool and in farm equipment machinery.

Such devices were used in automotive applications in the past. In one of these applications a vacuum control system was utilized to establish the ratio between the pulleys while the squeeze force was controlled by a spring member. There have been many systems proposed using various hydraulic controls and mechanical controls for establishing both the squeeze force and the drive ratios within the belt system.

The embodiments of the invention in which an exclusive property or privilege is claimed are defined as follows:

1. A torque sensitive squeeze control system for a variable ratio pulley drive mechanism comprising: input drive shaft means for transmitting input torque; input pulley means having a movable sheave and control means for controlling the movement thereof; output pulley means having a movable sheave; belt means for frictionally transmitting torque between said pulleys as determined by the squeeze force imposed thereon by said movable sheave of said input pulley means and being operable at a plurality of pitch diameters on said pulleys as determined by the position of said movable sheave on said output pulley means; and hydraulic fluid translating means having two fluid pump members with one fluid pump member drivingly connected with said input drive shaft means, the other fluid pump member drivingly connected with said input pulley means for transmitting torque to said input pulley means, fluid conduit means connected between said fluid translating means and said control means for directing fluid pressure to said control means at a pressure level proportioned to the torque transmitting by said input drive means when said fluid pump members are rotating at the same speed to control the squeeze force on the belt means at a value proportional to the torque transmitted, said fluid translating means being effective to increase the squeeze force at said input pulley means when said one fluid pump member is rotating faster than said other fluid pump member.

* * * * *